No. 648,204. Patented Apr. 24, 1900.
W. C. HARRIS.
BUSHING FOR LOOSE PULLEYS.
(Application filed Sept. 30, 1899.)
(No Model.)

Witnesses
E. J. Wilson
Arthur C. Lotz

Inventor:
William C. Harris
By Rudolph Wm. Lotz
Attorney

UNITED STATES PATENT OFFICE.

WILLIAM C. HARRIS, OF CHICAGO, ILLINOIS.

BUSHING FOR LOOSE PULLEYS.

SPECIFICATION forming part of Letters Patent No. 648,204, dated April 24, 1900.

Application filed September 30, 1899. Serial No. 732,163. (No model.)

*To all whom it may concern:*

Be it known that I, WILLIAM C. HARRIS, a citizen of the United States, residing at Chicago, in the county of Cook and State of Illinois, have invented certain new and useful Improvements in Bushings for Loose Pulleys; and I do hereby declare the following to be a full, clear, and exact description of the invention, such as will enable others skilled in the art to which it appertains to make and use the same.

My invention relates to a novel construction in a bushing for loose pulleys, the object being to provide a device of this character which can be readily removed and replaced without removing the pulley from the shaft or taking down the shaft; and it consists in the features of construction hereinafter fully described and claimed.

Figure 1:
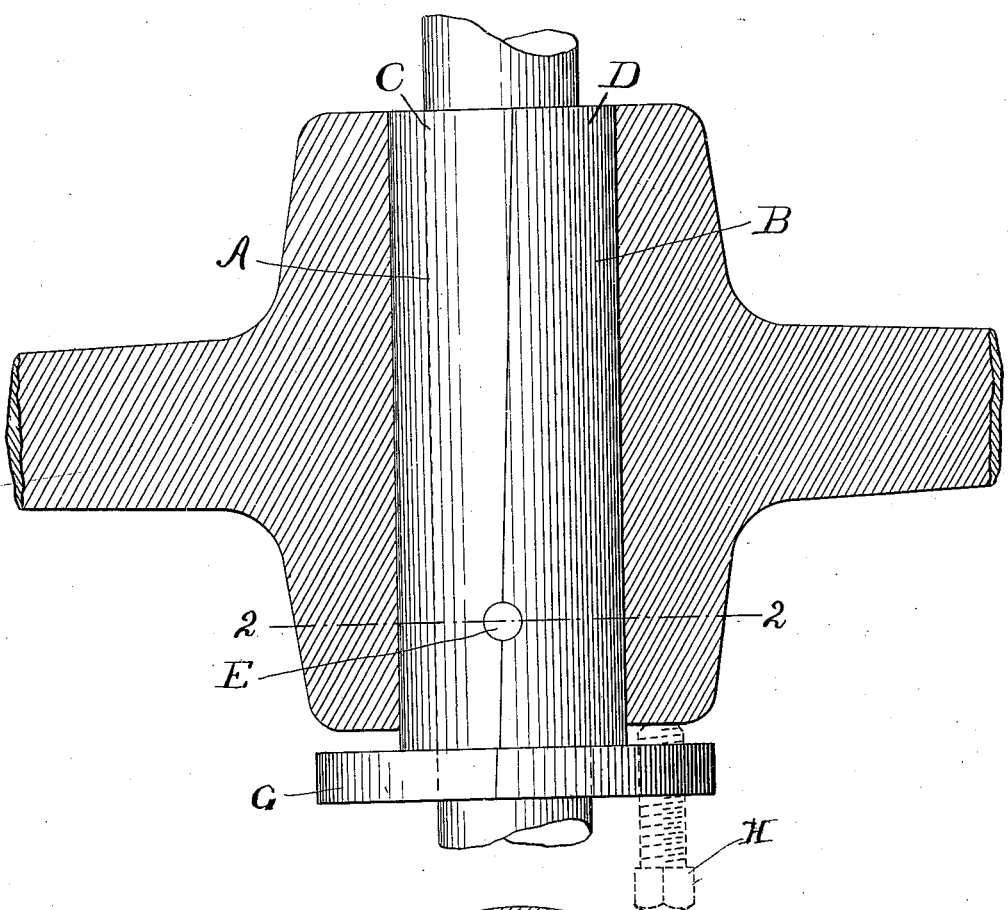
Figure 2:
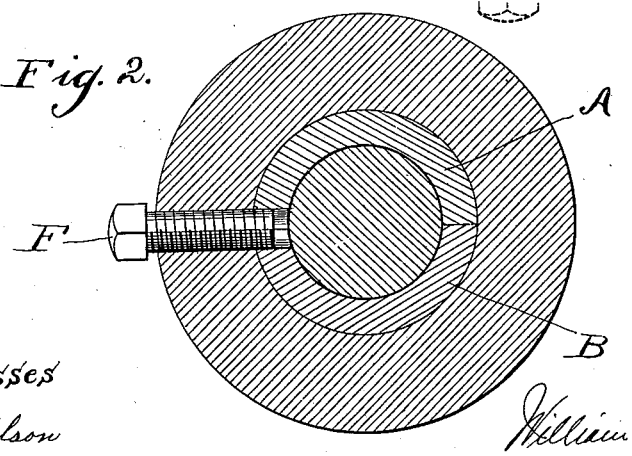

In the accompanying drawings, illustrating my invention, Figure 1 is a fragmentary sectional view through the hub portion of a pulley, showing my bushing therein in elevation. Fig. 2 is a transverse section on the line 2 2 of Fig. 1.

My bushing consists of two parts A and B, which when fitted together form a cylinder. Each of said parts A and B forms one-half or approximately one-half of such cylinder without being semicylindrical, the meeting faces of each being cut on an incline—that is, on a plane inclined to the axial line of said cylinder—so that one end of each section is greater than semicircular and the other end of each is less than semicircular, the smaller end of one section and the larger end of the other together forming a complete circle. Thus the end C of section A is greater than a semicircle and the end D of section B is less, but together they form a complete circle. Each section thus forms a wedge.

In mounting said bushing in the hub of a pulley the section A is first inserted with its larger end C foremost until in the desired position. Section B is then inserted with its smaller end D foremost and is forced into position relative to said section A in any suitable manner. By this means the bushing is firmly wedged into the hub without becoming wedged upon the shaft. An opening E is bored into said bushing on the dividing-line between the sections, so that a practically-semicircular recess is cut into each section. When in place on said pulley, said opening E receives the end of a set-screw F, passing through the hub of the pulley, whereby said bushing is further held rigid with said pulley and the sections A and B held against relative displacement.

Said bushing is preferably flanged at one end, as at G, to provide means for withdrawing same from the hub. To this end said flange G on the section B is provided with a screw-threaded opening adapted to receive a set-screw (shown in dotted lines) which is adapted to bear against the end of the hub, so that by turning same continuously in one direction the section in which it is mounted will be withdrawn, the set-screw H being preferably used for this purpose.

I claim as my invention—

1. A bushing for loose pulleys and the like, comprising two practically-semicylindrical sections adapted, when fitted together, to form a cylinder, the meeting faces of said section being cut on a plane inclined to and intersecting the axial line of said cylinder, and there being an approximately-cylindrical recess in one of the meeting faces of each section adapted to form an opening in said cylinder, and an approximately-cylindrical set-screw adapted to enter said opening, whereby both sections of said cylinder are held rigid with a pulley and each section thereof held against relative displacement.

2. A bushing for loose pulleys and the like, comprising two practically-semicylindrical sections adapted, when fitted together, to form a cylinder, there being an approximately-cylindrical opening composed of two semicylindrical recesses formed in the meeting faces of said sections, and an approximately-cylindrical set-screw adapted to fit said opening and bear against the meeting faces of each of said sections to prevent their withdrawal from the pulley, a flange at one end of each of said sections adapted to form an annular flange at one end of said cylinder, one flange having a screw-threaded opening, and a set-screw adapted to enter said threaded opening to bear against the hub of the pulley to withdraw said bushing.

3. A bushing for loose pulleys and the like, comprising two practically-semicylindrical sections adapted, when fitted together, to form a cylinder, the meeting faces of said sections being cut on a plane inclined to and intersecting the axial line of said cylinder, there being a recess in one of the meeting faces of each section adapted to form an opening in said cylinder, a set-screw inserted therein, whereby said cylinder is held rigid with a pulley and the sections thereof held against relative displacement, a flange at one end of each of said sections adapted to form an annular flange at one end of said cylinder, there being a screw-threaded opening in one of said flanges and a set-screw adapted to fit said opening and to bear against the hub of the pulley to withdraw said bushing.

In testimony whereof I affix my signature in presence of two witnesses.

WILLIAM C. HARRIS.

Witnesses:
RUDOLPH WM. LOTZ,
ARTHUR C. LOTZ.